(12) United States Patent
Lim et al.

(10) Patent No.: US 8,885,920 B2
(45) Date of Patent: Nov. 11, 2014

(54) IMAGE PROCESSING APPARATUS AND METHOD

(75) Inventors: Hwa Sup Lim, Hwaseong-Si (KR); Byong Min Kang, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 224 days.

(21) Appl. No.: 12/923,452

(22) Filed: Sep. 22, 2010

(65) Prior Publication Data
US 2011/0069888 A1    Mar. 24, 2011

(30) Foreign Application Priority Data
Sep. 22, 2009    (KR) .................. 10-2009-0089787

(51) Int. Cl.
*G06K 9/00*    (2006.01)
(52) U.S. Cl.
CPC .................. *G06K 9/00369* (2013.01)
USPC .................. 382/154; 382/118; 382/209
(58) Field of Classification Search
None
See application file for complete search history.

(56) References Cited

U.S. PATENT DOCUMENTS

| 7,931,604 B2* | 4/2011 | Even Zohar et al. .......... 600/595 |
| 2004/0032971 A1* | 2/2004 | Nagaoka et al. .............. 382/103 |
| 2004/0119716 A1* | 6/2004 | Park et al. .................... 345/473 |
| 2009/0103815 A1* | 4/2009 | Inada et al. ................... 382/209 |
| 2009/0175540 A1* | 7/2009 | Dariush et al. ............... 382/195 |
| 2009/0252423 A1* | 10/2009 | Zhu et al. ..................... 382/209 |
| 2009/0278945 A1* | 11/2009 | Lin ............................ 348/208.1 |
| 2010/0034457 A1* | 2/2010 | Berliner et al. ............... 382/154 |

FOREIGN PATENT DOCUMENTS

| JP | 2003-109015 | 4/2003 |
| JP | 2005-339100 | 12/2005 |
| KR | 2002-0017576 | 3/2002 |
| KR | 10-2004-0055310 | 6/2004 |
| KR | 10-2007-0055210 | 5/2007 |
| KR | 10-2007-0120443 | 12/2007 |
| KR | 10-2009-0049438 | 5/2009 |

\* cited by examiner

*Primary Examiner* — Jason M Repko
*Assistant Examiner* — David Perlman
(74) *Attorney, Agent, or Firm* — Staas & Halsey LLP

(57) ABSTRACT

An image processing apparatus is provided. A silhouette extractor may extract a silhouette image of a target object from an input depth image. A first calculator may determine a location of at least one limb of the target object and a location of at least one joint connecting the at least one limb by applying a rectangle fitting algorithm with respect to the silhouette image.

22 Claims, 10 Drawing Sheets

<u>300</u>

IMAGE PROCESSING APPARATUS AND METHOD

CROSS-REFERENCE TO RELATED APPLICATIONS

This application claims the benefit of Korean Patent Application No. 10-2009-0089787, filed on Sep. 22, 2009, in the Korean Intellectual Property Office, the disclosure of which is incorporated herein by reference.

BACKGROUND

1. Field

One or more embodiments of the present disclosure relate to a technology for capturing motion of a human being to create a three-dimensional (3D) model of a particular posture, and more particularly, to an image processing method and apparatus that may be applicable to virtual reality, a 3D display device, a video game, home entertainment, and the like using a 3D motion capturing scheme.

2. Description of the Related Art

Currently, there is an increased interest in a technology that may be used to capture motion of a target object, for example, a human body in an actual space, and to realize the captured motion in a three-dimensional (3D) space such as a video game, a virtual world, a movie computer graphic (CG), and the like.

In the above technology referred to by various names, including for example, motion capturing technology, motion estimation technology, etc., motion capturing of a target object is performed by attaching markers to major portions of the target object, and by calculating locations of the markers over the 3D space using a separate sensor.

Also introduced is a scheme that may obtain images by photographing a target object at a plurality of viewpoints, for example, at least eight viewpoints, without using a separate marker or sensor, and may perform motion capturing of the target object.

The above two conventional schemes may have a relatively enhanced motion capture accuracy. However, the two conventional schemes may also require a separate device, for example, a marker, a sensor, a plurality of cameras, and the like. Accordingly, since a utilization of the schemes is spatially limited and the equipment is expensive, commercialization of the schemes may be difficult.

SUMMARY

According to an aspect of one or more embodiments of the present disclosure, there may be provided an image processing apparatus including a silhouette extractor to extract a silhouette image of a target object from an input depth image, and a first calculator to determine a location of at least one limb of the target object and a location of at least one joint connecting the at least one limb by applying a rectangle fitting algorithm with respect to the silhouette image.

The target object may correspond to a human body.

The silhouette extractor may select, from pixels included in the input depth image, pixels having a depth value less than or equal to a first threshold. The silhouette extractor may remove, from the selected pixels, pixels corresponding to a depth value of a horizontal plane to extract the silhouette image from the input depth image.

The silhouette extractor may select, from the pixels included in the input depth image, pixels having the depth value less than or equal to the first threshold and having an infrared intensity greater than or equal to a second threshold, by referring to an intensity image associated with the input depth image. The silhouette extractor may remove, from the selected pixels, the pixels corresponding to the depth value of the horizontal plane to extract the silhouette image from the input depth image.

The silhouette extractor may select, from pixels included in the input depth image, pixels having a depth value less than or equal to a first threshold. The silhouette extractor may remove, from the selected pixels, pixels corresponding to a depth value of a horizontal plane, to extract the silhouette image from the input depth image. The silhouette extractor may group pixels of the silhouette image by applying connected component labeling to the pixels of the silhouette image, and perform post-processing of removing a pixel group excluding the target object.

The first calculator may perform a training-based face detection with respect to the silhouette image, detect a torso portion using the rectangle fitting algorithm based on a detected face portion, and apply the rectangle fitting algorithm based on the detected torso portion to determine the location of the at least one limb and the location of the at least one joint.

The image processing apparatus may include a second calculator to generate a skeleton model by applying an inverse-kinematics scheme to the determined location of the at least one limb and the location of the at least one joint, and to calculate motion capture information of the target object.

The image processing apparatus may include a filtering unit to perform time-based filtering or frequency-based filtering when the motion capture information is provided as a plurality of frames.

According to another aspect of one or more embodiments, there may be provided an image processing apparatus including a silhouette extractor to extract a silhouette image of a target image from an input depth image, a first calculator to determine a location of a torso portion of the target object, a location of at least one limb of the target object, and a location of at least one joint connecting the at least one limb by performing a training-based face detection with respect to the extracted silhouette image, and by consecutively applying a rectangle fitting algorithm based on a detected face portion, and a second calculator to calculate motion capture information of the target object based on the detected face portion, the location of the torso portion, the location of the at least one limb, and the location of the at least one joint.

The second calculator may perform skeleton matching by applying an inverse-kinematics scheme with respect to the detected face portion, the location of the torso portion, the location of the at least one limb, and the location of the at least one joint to calculate motion capture information of the target object.

According to still another aspect of one or more embodiments, there may be provided an image processing method including extracting a silhouette image of a target object from an input depth image, and determining a location of at least one limb of the target object and a location of at least one joint connecting the at least one limb by applying a rectangle fitting algorithm with respect to the silhouette image.

The extracting of the silhouette image may include selecting, from pixels included in the input depth image, pixels having a depth value less than or equal to a first threshold, and removing, from the selected pixels, pixels corresponding to a depth value of a horizontal plane to extract the silhouette image from the input depth image.

The extracting of the silhouette image may include selecting, from the pixels included in the input depth image, pixels having the depth value less than or equal to the first threshold and having an infrared intensity greater than or equal to a second threshold, by referring to an intensity image associated with the input depth image, and removing, from the selected pixels, the pixels corresponding to the depth value of the horizontal plane to extract the silhouette image from the input depth image.

According to yet another aspect of one or more embodiments, there may be provided an image processing method including extracting a silhouette image of a target image from an input depth image, determining a location of a torso portion of the target object, a location of at least one limb of the target object, and a location of at least one joint connecting the at least one limb by performing a training-based face detection with respect to the extracted silhouette image, and by consecutively applying a rectangle fitting algorithm based on a detected face portion, and calculating motion capture information of the target object based on the detected face portion, the location of the torso portion, the location of the at least one limb, and the location of the at least one joint.

According to embodiments, since expensive equipments are not utilized, it is possible to perform motion capturing of a target object, for example, a human body at relatively small costs.

According to still another aspect of one or more embodiments, an image processing method may be provided. The image processing apparatus includes a silhouette extractor to extract a silhouette image of a target object from an input depth image by excluding pixels where a depth value of the input depth image is less than or equal to a predetermined threshold, a first calculator to calculate locations of at least one limb and joint of the silhouette image based on some other detected portion of the silhouette image by repeatedly applying a rectangle fitting algorithm, and a second calculator to calculate motion capture information of the target object based on the calculated locations of the at least one limb and joint.

Also, according to embodiments, since restriction conditions, for example, a background in a single color are relatively small, it is possible to significantly decrease spatial restrictions with respect to a motion capture.

Also, according to embodiments, when a quick frame conversion is utilized in an online motion capture, a 3D game, and the like, it is possible to perform motion capturing.

Additional aspects, features, and/or advantages of exemplary embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the exemplary embodiments, taken in conjunction with the accompanying drawings of which.

DETAILED DESCRIPTION

Figure 1:
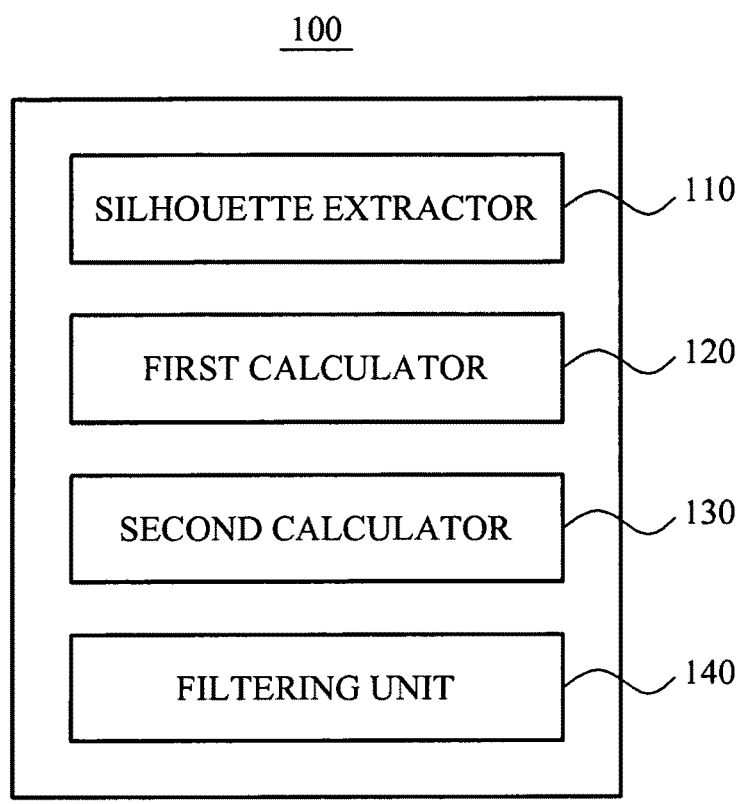
FIG. 1 illustrates an image processing apparatus according to an embodiment.

Reference will now be made in detail to exemplary embodiments, examples of which are illustrated in the accompanying drawings, wherein like reference numerals refer to like elements throughout. Exemplary embodiments are described below to explain the present disclosure by referring to the figures.

FIG. 1 illustrates an image processing apparatus 100 according to an embodiment.

A silhouette extractor 110 may extract a three-dimensional (3D) silhouette image from an input depth image.

The silhouette extractor 110 may remove remaining pixels, excluding pixels where a depth value of the input depth image is less than or equal to a first threshold.

In addition, the silhouette extractor 110 may remove remaining pixels, excluding pixels where the depth value of the input depth image is less than or equal to the first threshold, and an intensity value is greater than or equal to a second threshold.

The silhouette extractor 110 may extract the 3D silhouette image by grouping unremoved pixels, and by detecting only a portion corresponding to a target object, for example, a human body.

An operation of the silhouette extractor 110 will be further described below with reference to FIGS. 3 and 4.

A first calculator 120 may retrieve limbs and joints of a torso portion, an arm portion, and a leg portion based on some other detected portion, for example, based on a detected face portion or head portion.

During the above process, the first calculator 120 may repeatedly apply a rectangle fitting algorithm in an order of the head portion, the torso portion, and the arm/leg portion.

A process of determining, by way of the first calculator 120, locations of limbs and joints by repeatedly applying the rectangle fitting algorithm will be further described below with reference to FIG. 5.

A second calculator 130 may calculate motion capture information based on the calculated locations of limbs and joints.

In addition to the locations of limbs and joints calculated by the first calculator 120 through repeating the rectangle fitting algorithm, the second calculator 130 may calculate locations of additional limbs and joints using an inverse-kinematics scheme. Through the above process, a skeleton model of the target object may be generated.

An operation of the second calculator 130 will be further described below with reference to FIGS. 6 through 8.

A filtering unit 140 may perform post-processing filtering with respect to a single frame skeleton model, or may perform post-processing filtering with respect to a plurality of frame skeleton models.

The entire motion capture quality may be enhanced by post-processing filtering of the filtering unit 140, for example, based on time-based low pass filtering.

An operation of the filtering unit 140 will be further described below with reference to FIG. 9.

Figure 2:
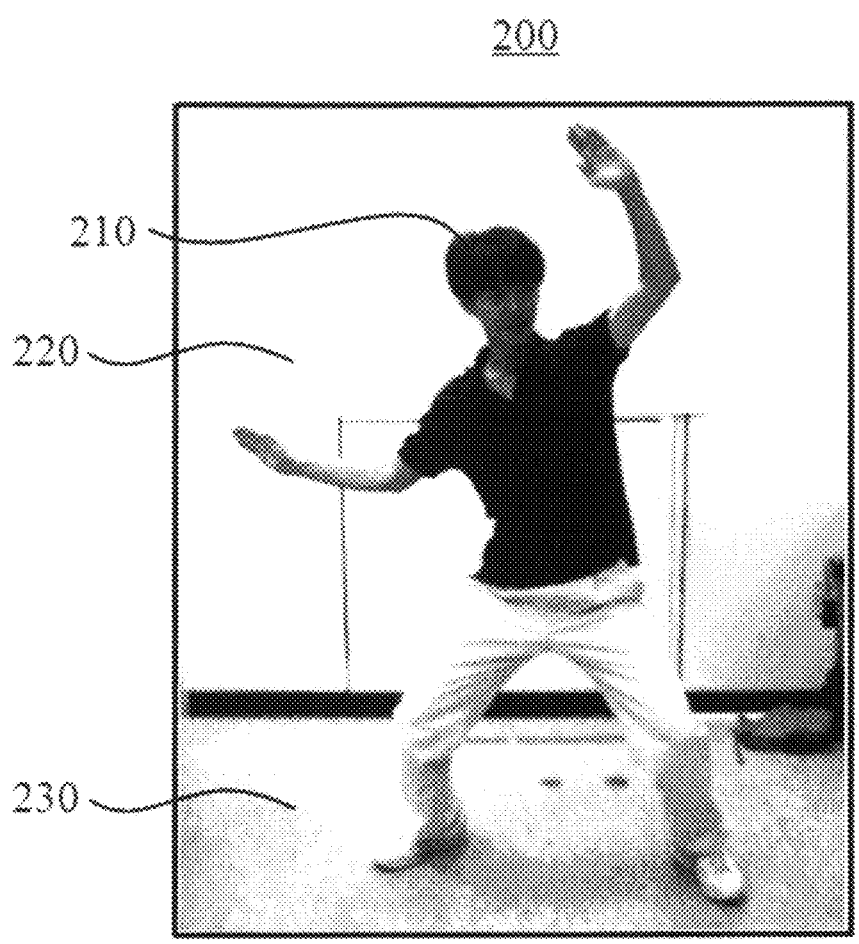
FIG. 2 illustrates a target object to perform motion capturing according to an embodiment.

FIG. 2 illustrates a target object 210 on which to perform motion capturing according to an embodiment.

Objects of a color image 200 include the target object 210 on which the actual motion capturing is performed, for example, a human body, a wall 220 and a floor 230.

The image processing apparatus 100 may perform motion capturing of the target object 210, and thus may separate the target object 210 from other objects, for example, the wall 220 and the floor 230.

Figure 3:
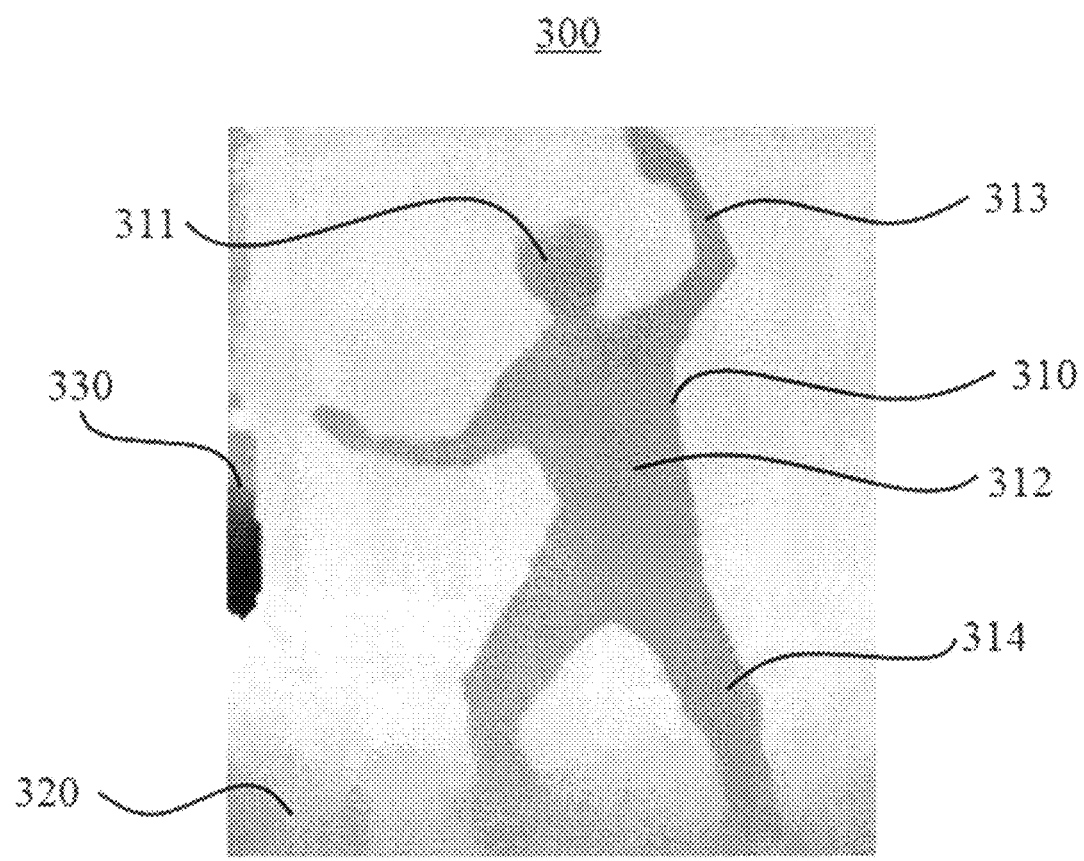
FIG. 3 illustrates a depth image of the target object of FIG. 2.

FIG. 3 illustrates a depth image 300 of the target object 210 of FIG. 2.

The depth image 300 may be obtained by photographing the objects including the target object 210 in a 3D space, and may be input into the image processing apparatus 100.

Each of the pixels included in the depth image 300 may have an x coordinate value, a y coordinate value, and a z coordinate value. The z coordinate value may correspond to a depth value.

To perform motion capturing of the target object 210, the silhouette extractor 110 of the image processing apparatus 100 may extract, from the depth image 300, pixels of a portion 310 associated with the target object 210.

The silhouette extractor 110 may remove remaining pixels, for example, excluding pixels where a depth value of the depth image 300 is less than or equal to a first threshold.

In the above example, the target object 210 may be closer to a depth camera for generating the depth image 300 compared to other objects and the background. Accordingly, pixels corresponding to the wall 220 and a rear portion of the floor 230 of FIG. 2 that are in the background will be removed.

In this case, when an intensity image that is additionally obtained from a photographing process of the depth image 300 is also input, the silhouette extractor 110 may remove remaining pixels, for example, excluding pixels where the depth value of the depth image 300 is less than or equal to the first threshold and an intensity value is greater than or equal to a second threshold.

The above process may be useful to remove a background, for example, reducing an error caused by a depth folding phenomenon, and the like.

The silhouette extractor 110 may induce a modeling equation of the floor 230, for example, using three random pixels provided in a lower portion of the depth image 300.

Pixels satisfying the modeling equation of the floor 230, among pixels of the depth image 300, may be determined to be unassociated with the target object 210 and thus may be removed.

The silhouette extractor 110 may then group the remaining pixels, excluding the pixels removed using the above scheme.

When a floor surface, a wall surface, and the like, are removed, the grouping process may be performed for unremoved pixels using connected component labeling. When at least two pixel groups having the same label are generated, the portion 310 associated with the target object 210 may be searched based on the generated at least two pixel groups.

A process of searching pixel groups for a target object, for example a portion corresponding to a human body, may be performed using face detection, head detection, and the like. In the image processing method, the face detection scheme is well known and a training data based scheme may also be utilized.

For example, when grouping pixels having a depth value less than or equal to the first threshold and having an intensity value greater than or equal to the second threshold and remaining after removing a floor surface, a grouped portion including a face portion or a head portion 311 using the face detection scheme may be determined to correspond to a target object, for example, a human body.

Remaining pixel groups 320, 330, and the like may be removed.

The portion 310 corresponding to the target object 210 may be refined through post-process filtering.

When all the remaining portions excluding the portion 310 corresponding to the detected target object 210 are removed, a 3D silhouette image may remain.

Figure 4:
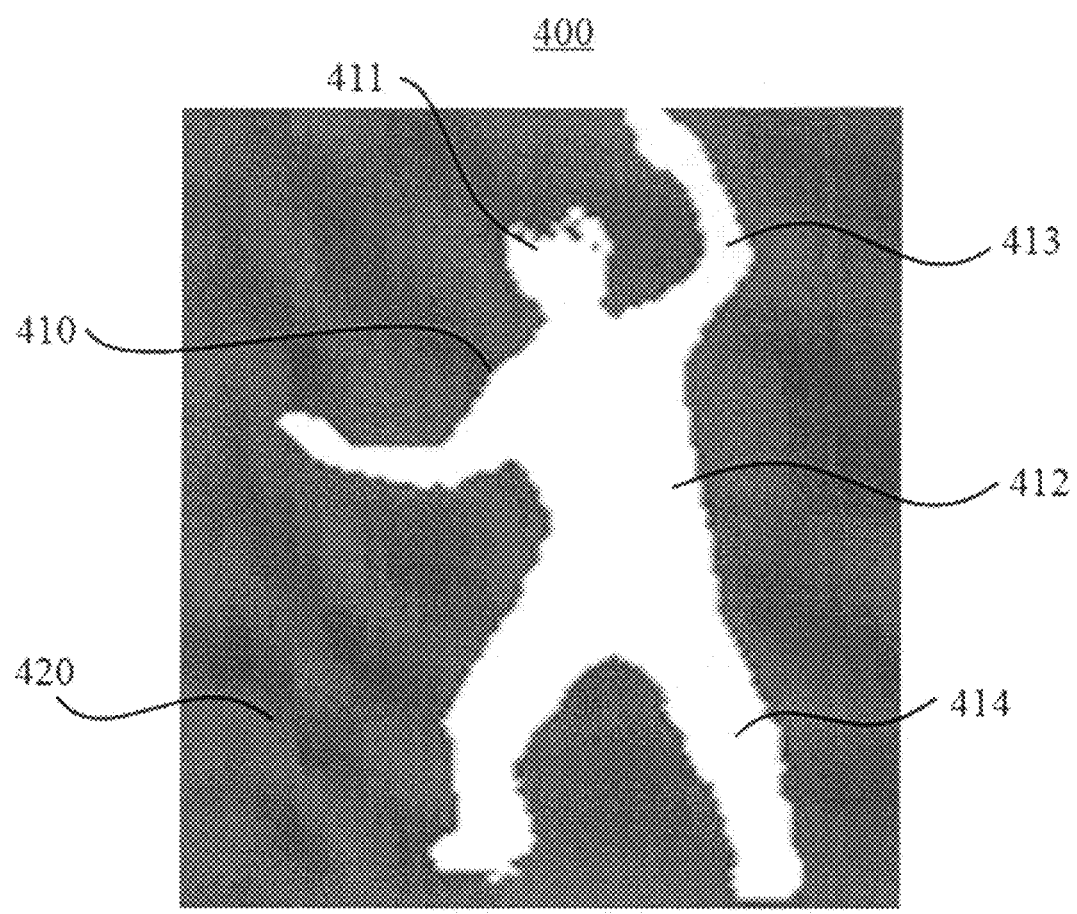
FIG. 4 illustrates a silhouette image extracted from the depth image of FIG. 3 according to an embodiment.

The 3D silhouette image is illustrated in detail in FIG. 4. Next, techniques to classify the head portion 311, a torso portion 312, an arm portion 313, and a leg portion 314 within the portion 310 corresponding to the target object 210, and techniques to perform motion capturing will be described with reference to FIG. 4.

FIG. 4 illustrates a silhouette image 400 extracted from the depth image 300 of FIG. 3 according to an embodiment.

The extracted silhouette image 400 may include a portion 410 corresponding to the target object 210 and a remaining portion 420. Here, only the portion 410 corresponding to the target object 210 may have a depth value.

As described above, when head detection is performed while extracting the silhouette image 400, information associated with a head portion 411 may not be detected again. Conversely, when head detection has not already been performed, the head detection may be performed, and locations of limbs and joints associated with a torso portion 412, an arm portion 413, and a leg portion 414 may be calculated.

A process of calculating locations of limbs and joints of the target object 210 using the silhouette image 400 will be described with reference to FIG. 5.

Figure 5:
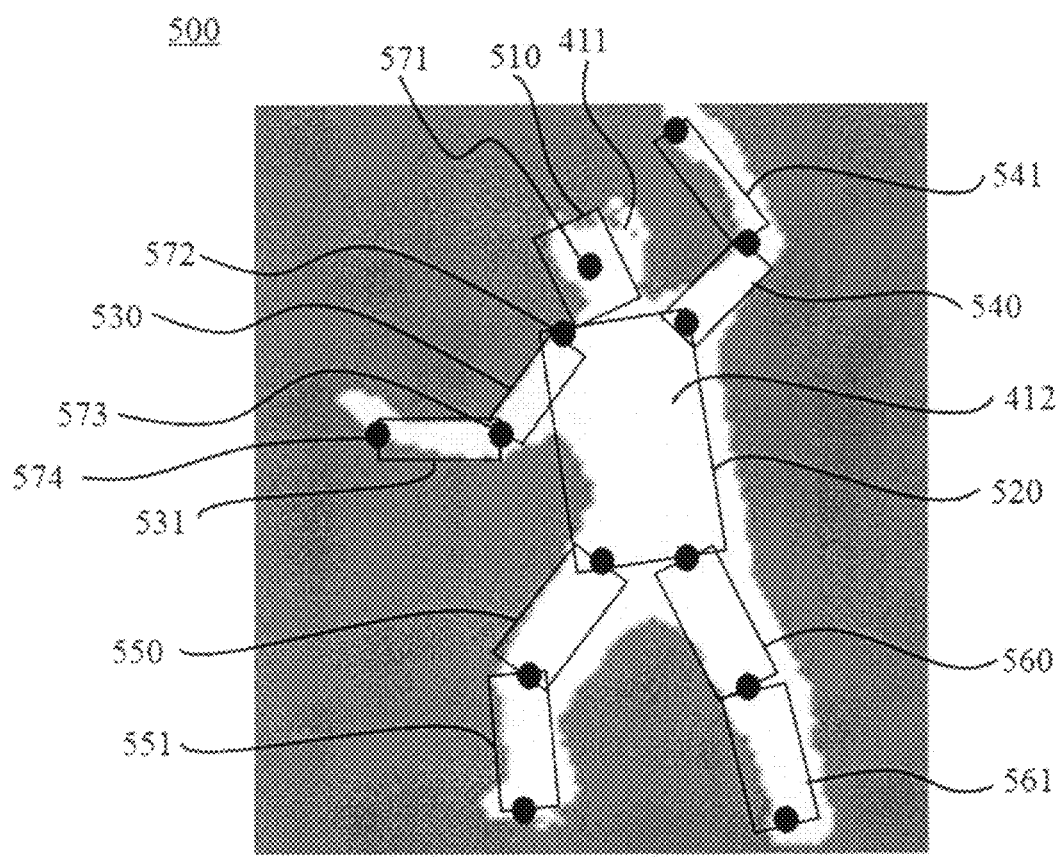
FIG. 5 illustrates a result of calculating locations of limbs and joints of the target object of FIG. 2 using the silhouette image of FIG. 4 according to an embodiment.

FIG. 5 illustrates a result 500 of calculating locations of limbs and joints of the target object 210 of FIG. 2 using the silhouette image 400 of FIG. 4 according to an embodiment.

A process of retrieving joints and limbs of the torso portion 412, the arm portion 413, and the leg portion 414 based on the detected face portion 411 may be performed by the first calculator 120 using a rectangle fitting algorithm.

A rectangle may be provided on the face portion 411 to optimally fit the face portion 411.

As a result of the above operation, a face portion rectangle 510 corresponding to the face portion 411 may be detected.

Since a torso is located below a face, another rectangle fitting process may be performed below the face portion rectangle 510 and thereby a torso portion rectangle 520 corresponding to the torso portion 412 may be detected. The torso portion rectangle 520 may be fit to optimally cover the torso portion 412.

When the torso portion rectangle 520 is detected, the same rectangle fitting process may be performed with respect to both arm portions and both leg portions.

The rectangle fitting process may be performed with respect to the arm portions and the leg portions, regardless of a sequence.

For example, when the rectangle fitting process is performed starting from a left-top corner of the torso portion rectangle 520, an upper elbow portion rectangle 530 may be detected and a lower elbow portion rectangle 531 may be detected.

By performing the rectangle fitting process with respect to the remaining arm portion, other rectangles 540 and 541 may be detected. By performing the rectangle fitting process with respect to both leg portions, rectangles 550, 551, 560, and 561 may be detected.

When the first calculator 120 detects a head and a torso by repeating the rectangle fitting process, and detects rectangles corresponding to limbs associated with both arms and legs based on the detected head and torso, locations of joints may also be determined.

A location 571 corresponding to a central point of the head portion rectangle 510 may be determined as a feature point. Joint locations 572, 573, and the like, or an end location 574 and the like between the torso and limbs may be determined as feature points.

In FIG. 5, a total of 13 feature points are determined.

Once locations of limbs and joints are determined, skeleton modeling may then be performed.

According to an embodiment, skeleton modeling may be performed after calculating more feature points based on the 13 feature points using an inverse-kinematics scheme.

Figure 6:
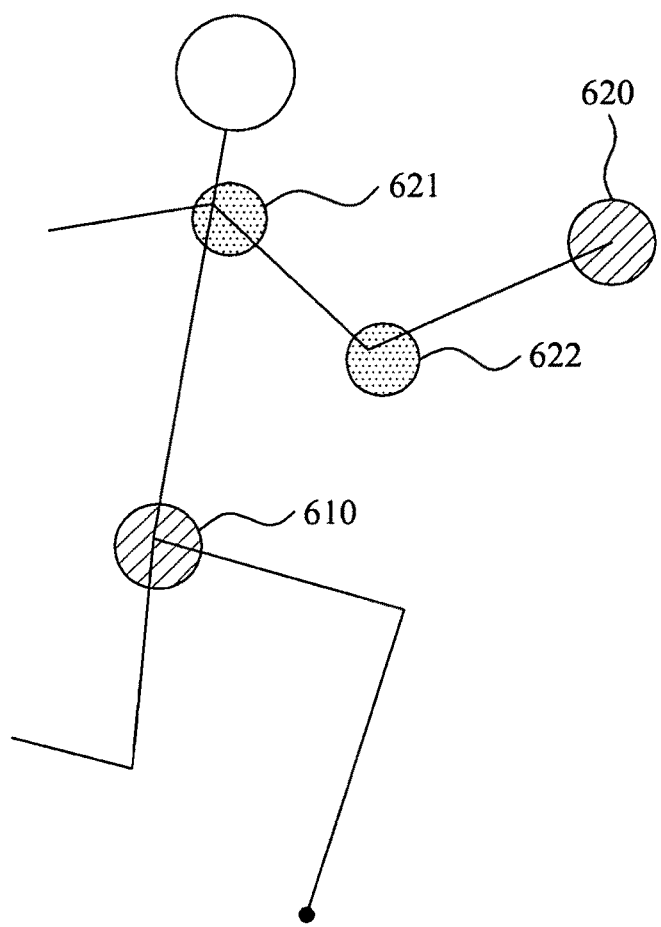
FIG. 6 illustrates a diagram to describe an inverse-kinematics scheme utilized for a motion capturing process according to an embodiment.

FIG. 6 illustrates a diagram to describe an inverse-kinematics scheme utilized for a motion capturing process according to an embodiment.

A process of estimating motions of points in a two-dimensional (2D) space will be described for easy description of the inverse-kinematics scheme.

Referring to FIG. 6, among a root point 610, a leaf point 620, and points 621 and 622 between the root point 610 and the leaf point 620, locations of two neighboring points may be associated with each other.

Here, the location of the root point 610 and the location of the leaf point 620 are given in advance. The inverse-kinematics scheme may correspond to one of the schemes for calculating locations of the points 621 and 622 between the root point 610 and the leaf point 620 using the given locations.

As shown in FIG. 6, in the case of locations of the root point 610 and the point 621, a mutual distance is constant and only a relative location or angle changes. Also, in the case of locations of 621 and 622, or locations of 622 and the leaf point 620, the mutual distance is constant and only the relative location or angle changes.

When only a 2D space is assumed, the location of the root point 610 and an inter-point distance may be known in advance. In this case, when only three angles are given, it is possible to be aware of locations of the leaf point 620, and the points 621 and 622.

When the location of the leaf point 620 is given, the locations of the points 621 and 622 may be calculated. This will be further described with reference to FIG. 7.

Figure 7:
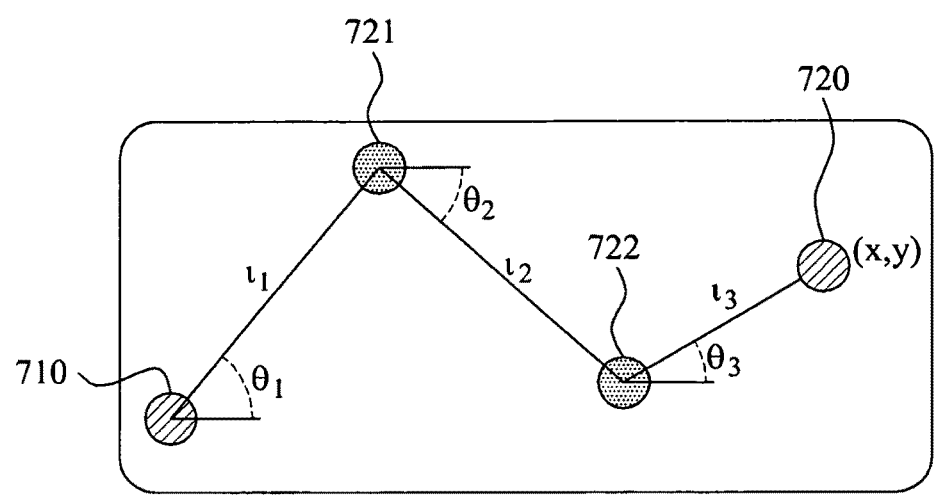
FIG. 7 illustrates a diagram to describe an inverse-kinematics scheme.

FIG. 7 illustrates a diagram to describe an inverse-kinematics scheme.

Referring to FIG. 7, a distance between a root point 710 and a point 721 is fixed as $l_1$, a distance between the point 721 and a point 722 is fixed as $l_2$, and a distance between the point 722 and a point 720 is fixed as $l_3$.

Here, when it is assumed that each of $l_1$, $l_2$, and $l_3$ is a constant and the root point 710 corresponds to an origin, coordinates (x, y) of the point 720 may be expressed by the following Equation 1:

$$x = l_1 \cos(\theta_1) + l_2 \cos(\theta_2) + l_3 \cos(\theta_3)$$

$$y = l_1 \sin(\theta_1) + l_2 \sin(\theta_2) + l_3 \sin(\theta_3).$$

Equation 1

When additional information, for example, x>0, y>0, $\theta_1 > 0$, $\theta_2 < 0$, and $\theta_3 > 0$ exists, and (x, y) are given, it is possible to calculate locations of $\theta_1$, $\theta_2$, and $\theta_3$ using a single solution. Accordingly, it is possible to verify locations of the points 721 and 722.

Specifically, even though only relative coordinates of the point 720 with respect to the root point 710 are known, it is possible to calculate the locations of the remaining points 721 and 722. The aforementioned process is referred to as inverse kinematics. In the above example, the inverse-kinematics scheme may calculate physical information, for example, coordinates of the points 721 and 722, using physical information, for example, relative coordinates (x, y) of the single point 720 excluding the root point 710.

The inverse-kinematics scheme may calculate locations of joint points using 13 feature points calculated by the first calculator 120 in FIG. 5.

Figure 8:
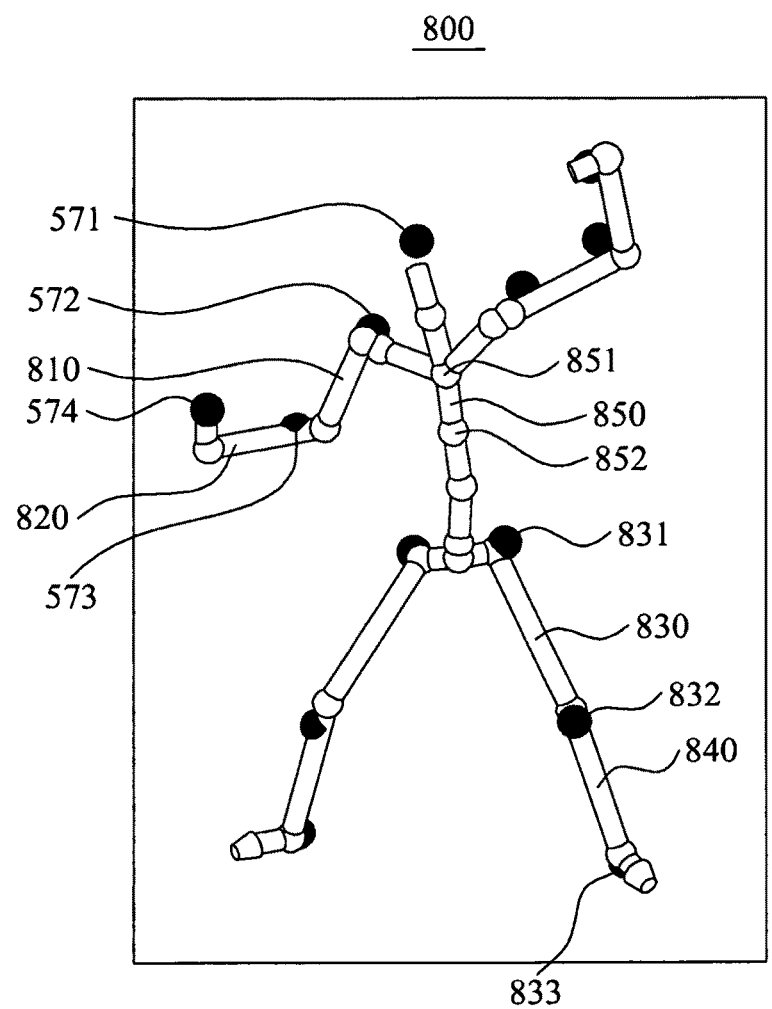
FIG. 8 illustrates a result of performing motion capturing of the target object of FIG. 2 according to an embodiment.

FIG. 8 illustrates a result 800 of performing motion capturing on the target object 210 of FIG. 2 according to an embodiment.

Points 571, 572, 573, 574, 831, 832, 833, etc., indicated in black correspond to a head or joint points that are directly detected by the first calculator 120.

Points 851, 852, etc., are detected using the inverse-kinematics scheme.

A portion between a plurality of points may determined as a location of a limb, for example, limbs 810, 820, 830, 840, etc. The second calculator 130 may generate a 3D skeleton based on the determined locations.

When the skeleton model is generated by the second calculator 130, motion capturing of the target object 210 may be completed.

As an example, it is possible to enhance an image processing quality using various types of pre-processing or post-processing operations.

Motion capturing may be performed with respect to a plurality of frames in addition to a particular single frame. This will be further described with reference to FIG. 9.

Figure 9:
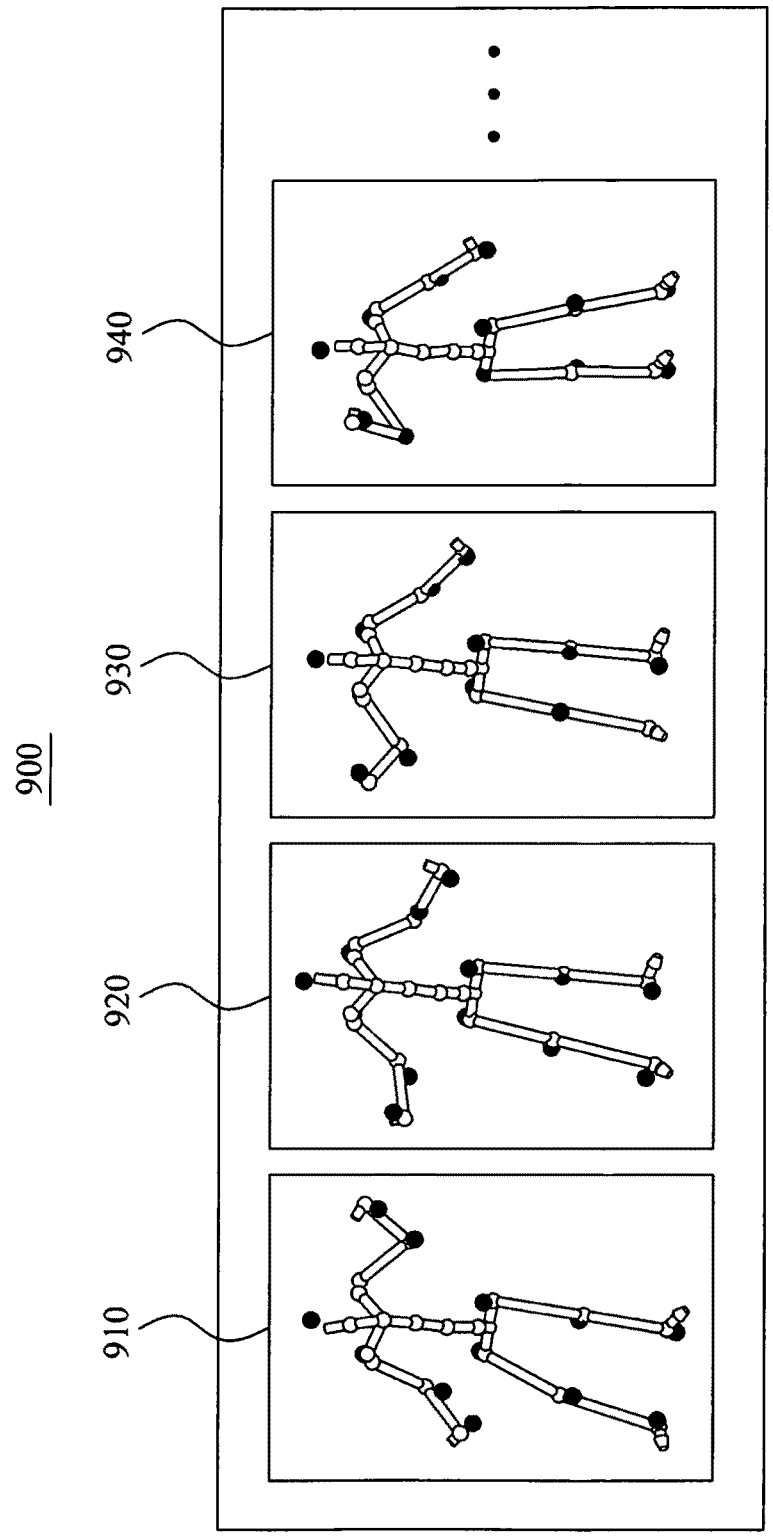
FIG. 9 illustrates a frame flowchart describing an image processing method performed when motion capturing is performed with respect to a plurality of frames according to an embodiment.

FIG. 9 illustrates a frame flowchart 900 describing an image processing method performed when motion capturing is performed with respect to a plurality of frames according to an embodiment.

The frame flowchart 900 includes a first frame skeleton model 910, a second frame skeleton model 920, a third frame skeleton model 930, and a fourth frame skeleton model 940.

The filtering unit 140 of the image processing apparatus 100 may perform time-based filtering or frequency-based filtering with respect to the first frame skeleton model 910 through the fourth frame skeleton model 940.

For example, the filtering unit 140 may perform time-based low pass filtering to remove any outliers occurring due to an error during the motion capturing process. Accordingly, it is possible to more smoothly depict a motion.

Figure 10:
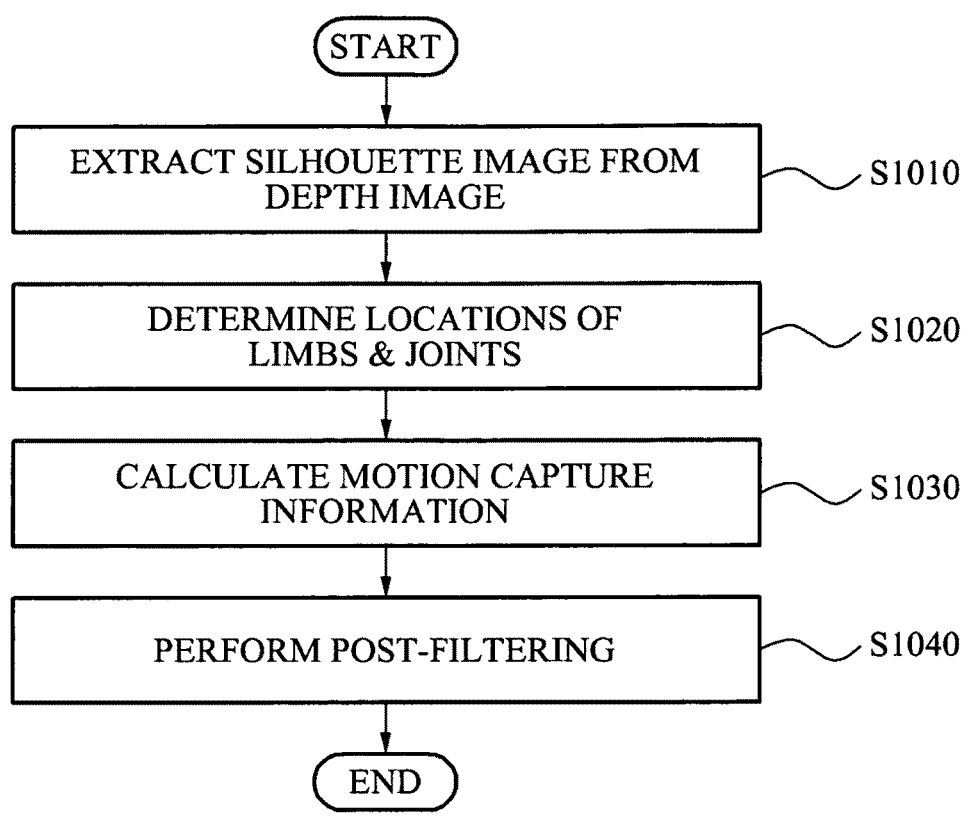
FIG. 10 illustrates an image processing method according to an embodiment.

FIG. 10 illustrates an image processing method according to an embodiment.

In operation S1010, a 3D silhouette image may be extracted from an input depth image.

During the above process, remaining pixels may be removed, for example, excluding pixels where a depth value of the input depth image is less than or equal to a first threshold. Also, remaining pixels, excluding pixels where the depth value of the input depth image is less than or equal to the first threshold, and an intensity value is greater than or equal to a second threshold may be removed.

A process of grouping unremoved pixels and detecting only a portion corresponding to a target object, for example, a human body to extract a 3D silhouette image is described above with reference to FIGS. 3 and 4 and thus further detailed description will be omitted here.

In operation S1020, limbs and joints associated with a torso portion, an arm portion, and a leg portion may be retrieved based on a detected face portion or head portion.

A rectangle fitting algorithm may be repeatedly applied in an order of the head portion, the torso portion, and the arm/leg portion during the above process, although other orders may also be used.

A process of determining locations of limbs and joints by repeatedly applying the rectangle fitting algorithm is described above with reference to FIG. 5.

In operation S1030, motion capture information may be calculated based on the locations of limbs and joints.

In addition to locations of limbs and joints retrieved by repeating the rectangle fitting algorithm, locations of additional limbs and joints may be calculated using an inverse-kinematics scheme. A skeleton model of the target object may be generated through the above process.

The process of generating the skeleton model is described above with reference to FIGS. 6 through 8 and thus further detailed description will be omitted here.

In operation S1040, post-processing filtering may be performed with respect to a single frame skeleton model or a plurality of frame skeleton models.

The post-processing filtering operation may enhance the entire motion capturing quality. It is described above with reference to FIG. 9 and thus further description will be omitted here.

The image processing method according to the above-described exemplary embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter.

The described hardware devices may be configured to act as one or more software modules in order to perform the operations of the above-described exemplary embodiments, or vice versa. The instructions may be executed on any processor, general purpose computer, or special purpose computer such as an image processing apparatus. Further, the software modules may be controlled by any processor. In addition, in some embodiments a computer-readable storage medium may be distributed among computer systems connected through a network and computer-readable codes or program instructions may be stored and executed in a decentralized manner.

Although a few exemplary embodiments have been shown and described, it would be appreciated by those skilled in the art that changes may be made in these exemplary embodiments without departing from the principles and spirit of the disclosure, the scope of which is defined by the claims and their equivalents.

What is claimed is:

1. An image processing apparatus comprising:
a processor to control one or more processor-executable units;
a silhouette extractor to extract a silhouette image of a target object from an input depth image; and
a first calculator, controlled by the processor, to determine a location of at least one limb of the target object and a location of at least one joint of the target object by applying a rectangle fitting algorithm with respect to the silhouette image, wherein the first calculator performs face detection with respect to the silhouette image, detects a torso portion using the rectangle fitting algorithm based on a detected face portion, and applies the rectangle fitting algorithm by using a corner of a torso portion rectangle of the detected torso portion to determine the location of the at least one limb and the location of the at least one joint, and wherein the first calculator calculates a first feature point based on the applying of the rectangle fitting algorithm with respect to the silhouette image; and
a second calculator, controlled by the processor, to calculate a second feature point based on the first feature point calculated by the first calculator using an inverse-kinematics scheme, to generate a skeleton model using the first feature point calculated by the first calculator and the second feature point calculated by the second calculator, wherein the second feature point calculated by the second calculator comprises an additional point location on the skeleton model different than the first feature point calculated by the first calculator, and to calculate motion capture information of the target object using the generated skeleton model.

2. The image processing apparatus of claim 1, wherein the target object corresponds to a human body.

3. The image processing apparatus of claim 1, wherein:
the silhouette extractor selects, from pixels included in the input depth image, pixels having a depth value less than or equal to a first threshold, and
the silhouette extractor removes, from the selected pixels, pixels corresponding to a depth value of a horizontal plane to extract the silhouette image from the input depth image.

4. The image processing apparatus of claim 3, wherein:
the silhouette extractor selects, from the pixels included in the input depth image, pixels having the depth value less than or equal to the first threshold and having an infrared intensity greater than or equal to a second threshold, by referring to an intensity image associated with the input depth image, and
the silhouette extractor removes, from the selected pixels, the pixels corresponding to the depth value of the horizontal plane to extract the silhouette image from the input depth image.

5. The image processing apparatus of claim 1, wherein:
the silhouette extractor selects, from pixels included in the input depth image, pixels having a depth value less than or equal to a first threshold,
the silhouette extractor removes, from the selected pixels, pixels corresponding to a depth value of a horizontal plane, to extract the silhouette image from the input depth image, and
the silhouette extractor groups pixels of the silhouette image by applying connected component labeling to the pixels of the silhouette image, and performs post-processing to remove a pixel group excluding the target object.

6. The image processing apparatus of claim 1, wherein, in the performing of the face detection, the first calculator performs a training-based face detection with respect to the silhouette image.

7. The image processing apparatus of claim 1, further comprising:
a filtering unit, controlled by the processor, to perform at least one of time-based filtering and frequency-based filtering when the motion capture information is provided as a plurality of frames.

8. An image processing apparatus comprising:
a processor to control one or more processor-executable units;
a silhouette extractor to extract a silhouette image of a target image from an input depth image;
a first calculator, controlled by the processor, to detect a location of a face portion of the target object, a location of a torso portion of the target object, a location of at least one limb of the target object, and a location of at least one joint connecting the at least one limb, by performing a training-based face detection with respect to the extracted silhouette image, and by consecutively applying a rectangle fitting algorithm based on the detected face portion, wherein the first calculator applies the rectangle fitting algorithm by using a corner of a torso portion rectangle of the detected torso portion to determine the location of the at least one limb and the location of the at least one joint and wherein the first calculator calculates a first feature point based on the applying of the rectangle fitting algorithm with respect to the silhouette image; and
a second calculator to calculate a second feature point based on the first feature point calculated by the first calculator using an inverse-kinematics scheme, to generate a skeleton model using the first feature point calculated by the first calculator and the second feature point calculated by the second calculator, and to calculate motion capture information of the target object using the generated skeleton model.

9. The image processing apparatus of claim 8, wherein:
the second calculator performs skeleton matching by applying an inverse-kinematics scheme with respect to the detected face portion, the location of the torso portion, the location of the at least one limb, and the location of the at least one joint to calculate motion capture information of the target object.

10. The image processing apparatus of claim 8, further comprising:
a filtering unit to perform at least one of time-based filtering and frequency-based filtering when the motion capture information is provided as a plurality of frames.

11. An image processing method comprising:
extracting, by way of a processor, a silhouette image of a target object from an input depth image;
determining a location of at least one limb of the target object and a location of at least one joint of the target object by applying a rectangle fitting algorithm with respect to the silhouette image, wherein in the determining of the location, face detection is performed with respect to the silhouette image, a torso portion is detected using the rectangle fitting algorithm based on a detected face portion, and the rectangle fitting algorithm is applied by using a corner of a torso portion rectangle of the detected torso portion to determine the location of the at least one limb and the location of the at least one joint;
calculating a first feature point based on the applying of the rectangle fitting algorithm with respect to the silhouette image;
calculating a second feature point, using an inverse-kinematics scheme, based on the calculated first feature point;
generating a skeleton model using the first calculated feature point and the second calculated feature point, wherein the second calculated feature point comprises an additional point location on the skeleton model different than the first feature point; and
calculate motion capture information of the target object using the generated skeleton model.

12. The image processing method of claim 11, wherein the extracting of the silhouette image comprises:
selecting, from pixels included in the input depth image, pixels having a depth value less than or equal to a first threshold; and
removing, from the selected pixels, pixels corresponding to a depth value of a horizontal plane to extract the silhouette image from the input depth image.

13. The image processing method of claim 11, wherein the extracting of the silhouette image comprises:
selecting, from the pixels included in the input depth image, pixels having the depth value less than or equal to the first threshold and having an infrared intensity greater than or equal to a second threshold, by referring to an intensity image associated with the input depth image; and
removing, from the selected pixels, the pixels corresponding to the depth value of the horizontal plane to extract the silhouette image from the input depth image.

14. The image processing method of claim 11, wherein the extracting of the silhouette image comprises:
selecting, from pixels included in the input depth image, pixels having a depth value less than or equal to a first threshold;
removing, from the selected pixels, pixels corresponding to a depth value of a horizontal plane, to extract the silhouette image from the input depth image; and
grouping pixels of the silhouette image by applying connected component labeling to the pixels of the silhouette image, and performing post-processing to remove a pixel group excluding the target object.

15. The image processing method of claim 11, further comprising:
performing at least one of time-based filtering and frequency-based filtering when the motion capture information is provided as a plurality of frames.

16. An image processing method comprising:
extracting, by way of a processor, a silhouette image of a target image from an input depth image;
detecting a location of a face portion of the target object, a location of a torso portion of the target object, a location of at least one limb of the target object, and a location of at least one joint connecting the at least one limb by performing a training-based face detection with respect to the extracted silhouette image, and by consecutively applying a rectangle fitting algorithm based on the detected face portion, wherein the rectangle fitting algorithm is applied by using a corner of a torso portion rectangle of the detected torso portion to determine the location of the at least one limb and the location of the at least one joint
calculating a first feature point based on the consecutive applying of the rectangle fitting algorithm with respect to the silhouette image;
calculating a second feature point based on the first feature point using an inverse-kinematics scheme;
generating a skeleton model using the calculated first feature point calculated and the calculated second feature point; and
calculating motion capture information of the target object using the generated skeleton model.

17. The image processing method of claim 16, further comprising:

performing at least one of time-based filtering and frequency-based filtering when the motion capture information is provided as a plurality of frames.

18. A non-transitory computer-readable storage medium encoded with computer readable code comprising a program for implementing the method of claim 16.

19. An image processing apparatus comprising:
a processor to control one or more processor-executable units;
a silhouette extractor to extract a silhouette image of a target object from an input depth image by excluding pixels where a depth value of the input depth image is less than or equal to a predetermined threshold;
a first calculator, controlled by the processor, to calculate locations of at least one limb and joint of the silhouette image based on the detected portion of the silhouette image by repeatedly applying a rectangle fitting algorithm, wherein the first calculator performs face detection with respect to the silhouette image, detects a torso portion using the rectangle fitting algorithm based on a detected face portion, and applies the rectangle fitting algorithm by using a corner of a torso portion rectangle of the detected torso portion to determine the location of the at least one limb and the location of the at least one joint; and
a second calculator to generate a location of at least one additional limb or the location of the at least one additional joint by applying an inverse-kinematics scheme to the calculated locations of the at least one limb and joint calculated by the first calculator, to generate a skeleton model using the location of the at least one limb and the location of the at least one joint calculated by the first calculator and the location of the at least one additional limb or the location of the at least one additional joint calculated by the second calculator, and to calculate motion capture information of the target object using the generated skeleton model.

20. The image processing apparatus of claim 19, wherein in the performing of the face detection, the first calculator performs a training-based face detection with respect to the silhouette image.

21. The image processing apparatus of claim 20, further comprising:
a filtering unit to perform time-based filtering or frequency-based filtering when the motion capture information is provided as a plurality of frames.

22. The image processing apparatus of claim 8, wherein the second feature point comprises an additional point location on the skeleton model different than the first feature point.

* * * * *